C. A. WHITING.
VANELESS WINDMILL.
APPLICATION FILED OCT. 19, 1906. RENEWED SEPT. 23, 1908.
904,166.
Patented Nov. 17, 1908.
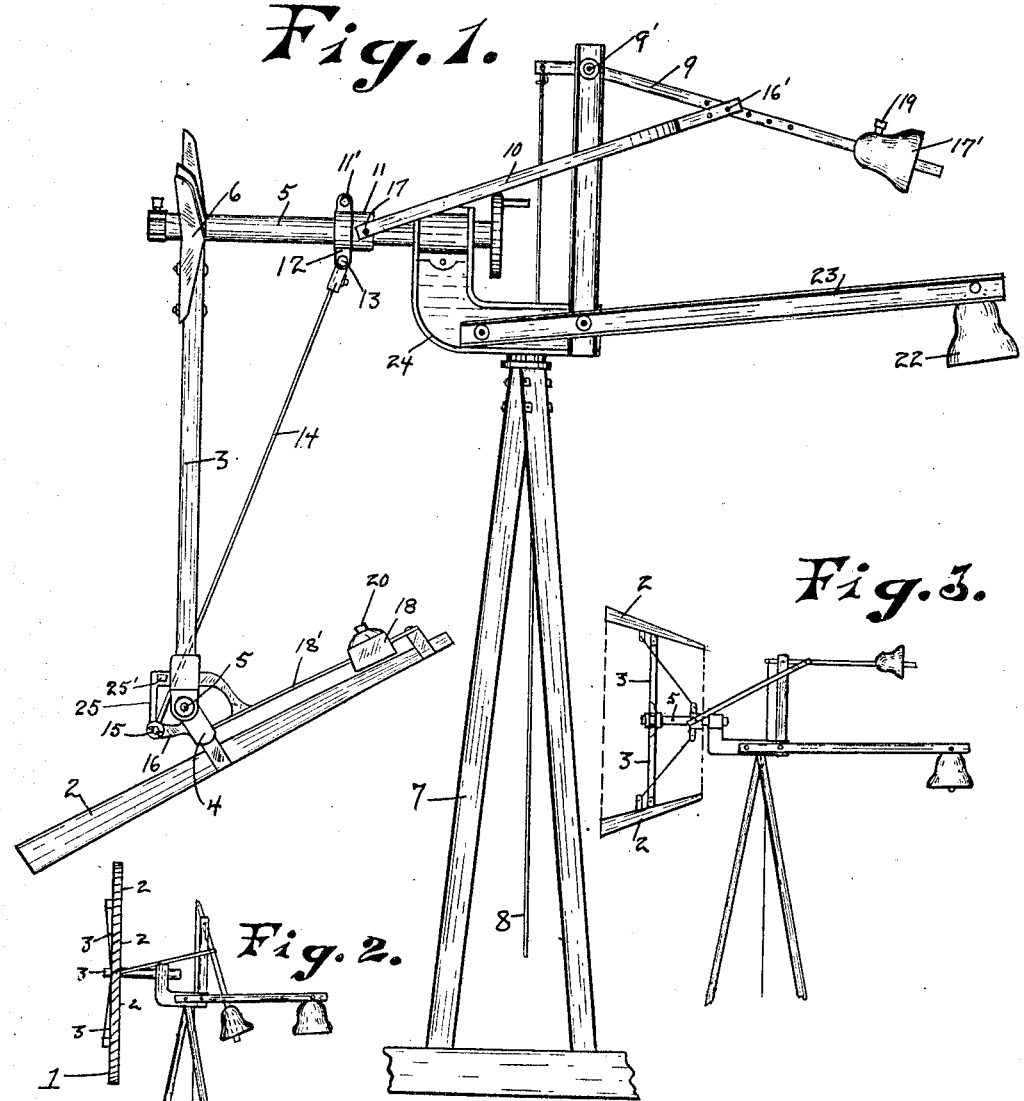
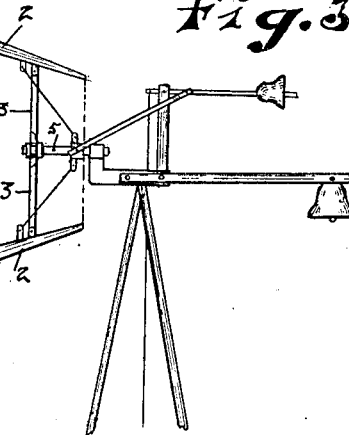
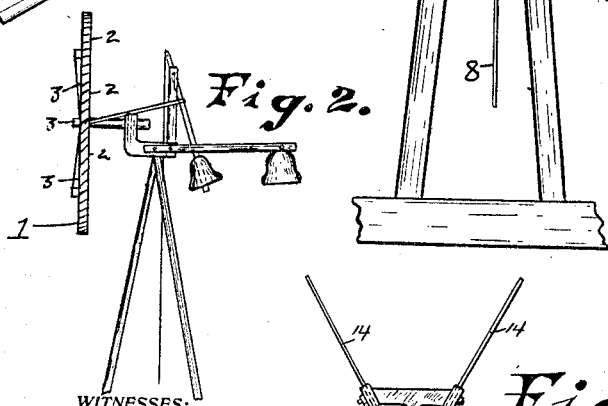

UNITED STATES PATENT OFFICE.

CHARLES A. WHITING, OF WAUPUN, WISCONSIN.

VANELESS WINDMILL.

No. 904,166.　　　Specification of Letters Patent.　　　Patented Nov. 17, 1908.

Application filed October 19, 1906, Serial No. 339,648. Renewed September 23, 1908. Serial No. 454,345.

*To all whom it may concern:*

Be it known that I, CHARLES A. WHITING, a citizen of the United States, residing at Waupun, county of Fond du Lac, and State of Wisconsin, have invented new and useful Improvements in Vaneless Windmills, of which the following is a specification.

My invention relates to improvements in so-called vaneless windmills and it pertains to that class of wind motors in which the wind actuated wheel is made up of a plurality of separate sections which are pivotally supported at their respective sides near their centers to a plurality of radial arms in such a manner that they are free to turn on such pivotal supports from an operative vertical position at right angles to their supporting shaft to a horizontal inoperative position and are thus turned both automatically by the force of the wind and manually at the will of a person, the automatic movement of the several sections being controlled by the centrifugal action of such sections and the weights carried by them, whereby when the wheel exceeds a certain predetermined speed, the several sections will be gradually turned as stated upon their pivotal supports into a horizontal position so as not to receive the direct force of the wind, whereby the action of the wheel is automatically governed so as to revolve at a substantially uniform speed regardless of slight variations of the speed of the wind or the load upon the wheel.

My invention further pertains to the means employed for increasing or diminishing the resistance to the automatic tilting movement of the sections upon their supporting pivots, whereby they may be run at any desired predetermined speed before they are automatically thrown out of wind from a revolving to a stationary position.

The construction of my invention is further explained by reference to the accompanying drawings in which, Figure 1 is a side view of my wheel supporting and operating mechanism in connection with one section only of the wheel, the other sections which are of like construction being removed. Fig. 2 is a diagrammatic view of the mill drawn upon a smaller scale to indicate the relative position of the sections, operating lever and weights to each other when in position for use. Fig. 3 is also a diagrammatic view showing the relative position of the sections of the wheel, operating lever and weights when the same are thrown out of wind and at rest, and Fig. 4 is an end view of a sliding collar which is mounted upon the main wheel supporting shaft.

Like parts are identified by the same reference characters throughout the several views.

1 represents the wind actuated wheel which comprises a plurality of separate independently supported sections 2, each of which is centrally connected at its respective sides with the outer ends of the radial arms 3 by the brackets 4 and pivotal bolts 5. The several sections 2 when thus supported from the radial arms are adapted as stated to be supported in the vertical position shown in Fig. 2 or at any desired angle to the vertical as indicated in Figs. 1 and 3, and are moved to and retained in such positions both manually and automatically.

When manually adjusted motion may be simultaneously communicated to the several sections from a person at the base of the tower 7 through the operating connection 8, lever 9, link 10, slidable collar 11, slidable and revoluble collar 11', radial lugs 12, pivotal bolts 13, radial shifting rods 14, pivotal bolts 15 and an integrally formed bracket. The pivotal bolts 15 are located eccentric to and outside of the circle described by the pivotal bolts 5 of the several sections, whereby an outward pressure brought to bear upon said bolts 15 will cause said sections to be turned upon their pivotal supports 5 from the position shown in Figs. 1 and 3 to that shown in Fig. 2.

Assuming that the several wheel sections are in operative position shown in Fig. 2 they are thrown out of operation manually by drawing down upon the operating connection 8, motion being communicated from said connection 8 through the connecting parts named. When, however, the connection 8 is released by the hand of the operator, said several connecting parts will be moved in the opposite direction by the gravity of the weight 17' acting through said lever 9, lever supporting pivot 9', link 10, collars 11 and 11', shifting rods 14, said integrally formed bracket and the several connecting pivots 16', 17, 13 and 15, whereby said several wheel sections will be brought back again to their normal vertical position shown in Fig. 2. Thus it is obvious that said wheel sections may be brought into working position by releasing the operating cord or connection 8 and thrown out of such operating position by drawing down upon said cord or connection 8.

To accelerate the automatic action of the wheel sections, I provide each of them with a weight 18 which is adjustably secured to their inner ends within their pivotal supports upon the supporting rod 18′, whereby it is obvious that as the speed of the wheel increases the inner ends of said sections will be thrown outwardly by the centrifugal action of said weights 18. The centrifugal action of the weights 18 is in part counteracted by the gravity of the weight 17′ acting, as stated, through the lever 9 and other connecting parts named, and the power of the weight 17′ to thus counteract the centrifugal action of the wheel sections and weight 18 may be increased or diminished by adjusting it nearer to or further from the end of said lever 9, while the power or centrifugal force of the weight 18 may also be increased or diminished by adjusting it nearer to or further from the inner converging ends of the wheel sections. The weight 17′ is provided with a set screw 19 by which it is secured at any desired point of adjustment upon the lever 9. The weight 18 is provided with a set screw 20 by which it is secured at any desired point of adjustment upon the rod 18′. Thus it will be obvious that by adjustment of the weights 17′ and 18 upon their supports the action of the wind actuated wheel may be nicely governed to run at any desired speed.

22 is a call bell of ordinary construction which is pivotally supported from the arm 23 which arm is in turn rigidly connected with the frame 24 of the mill. Thus the tower 7 of the mill serves as a convenient means for supporting the call bell in an elevated position from which it may be heard at a great distance and also serves as a counterweight to balance the weight of the wheel.

It will be understood that motion is communicated from the shaft 5 to a pump or other mechanism with which it is desirous to use the windmill in the ordinary manner. It will also be understood that the integrally formed bracket referred to comprises the members 16, 18′ and 25, all of which are cast integrally in a single piece of metal and move together as the sections 2 supported therefrom are tilted.

The brackets 25 are provided with laterally projecting stops 25′ which as the sections of the wheel are moved from the vertical position, shown in Fig. 2, to the horizontal position, shown in Fig. 3, are brought in contact with the shifting rod 14 when they serve to limit the movement of said sections, whereby when said sections are out of wind they will be rigidly retained in place.

Having thus described my invention what I claim as new and desire to secure by Letters Patent is,

1. In a windmill of the class described the combination of a central shaft, a revoluble shifting collar carried by said shaft, a plurality of radial arms supported at their inner ends from said shaft, a plurality of wheel sections pivotally supported eccentric to their longitudinal centers from the outer diverging ends of said radial arms, an integrally formed bracket comprising the member 16, 18′ and 25 rigidly attached to the outer face of the wheel sections and having one of its members extending forwardly and outwardly past the supporting pivots of said wheel sections, shifting rods connected at their outer ends to the outer end of said brackets and at their opposite ends with the revoluble shifting collar mounted upon the wheel supporting shaft, and means for communicating a forward and backward movement of said collar upon said shaft.

2. In a windmill of the class described the combination of a central shaft, a plurality of radial arms supported at their inner ends from said shaft, a plurality of wheel sections pivotally supported eccentric to their longitudinal centers from the outer diverging ends of said radial arms, an integrally formed bracket comprising the members 16, 18′ and 25 secured to the inner ends of said wheel sections, an adjustable weight carried by said integrally formed bracket, a slidable collar mounted on said shaft and adapted to revolve with it, means for communicating motion from said slidable collar to the center of said wheel sections, in front of said radial arms and outside of the pivotal connection of said sections with said radial arms, a non-revoluble collar slidably supported upon said shaft in contact with said revoluble collar, a lever supported from the mill supporting frame, an adjustable weight supported on said levers and means for communicating motion from said lever to said shaft supported sleeves and from said shaft supported sleeves to the integrally formed bracket carried by the wheel sections, whereby the gravity of said adjustable weight acting through the intermediate connections is adapted to counteract the centrifugal action of the weights on said wheel sections, substantially as set forth.

In testimony whereof I affix my signature in the presence of two witnesses.

CHARLES A. WHITING.

Witnesses:
Jas. B. Erwin,
O. R. Erwin.